United States Patent [19]

Iida

[11] Patent Number: 5,362,465

[45] Date of Patent: Nov. 8, 1994

[54] METHOD FOR OXIDIZING HYPOPHOSPHITE ION

[75] Inventor: Toshikazu Iida, Yokohama, Japan

[73] Assignee: Fujikasui Engineering Co. Ltd., Tokyo, Japan

[21] Appl. No.: 120,082

[22] Filed: Sep. 13, 1993

[30] Foreign Application Priority Data

| Mar. 4, 1993 | [JP] | Japan | 5-044032 |
| Mar. 5, 1993 | [JP] | Japan | 5-045431 |
| Mar. 5, 1993 | [JP] | Japan | 5-045478 |

[51] Int. Cl.$^5$ ............................................. C01B 25/12
[52] U.S. Cl. ................................................... 423/304
[58] Field of Search ........................................ 423/304

[56] References Cited

FOREIGN PATENT DOCUMENTS

| 882002 | 9/1971 | Canada. |
| 58-119389 | 7/1983 | Japan. |
| 63-80897 | 4/1988 | Japan. |
| 337349 | 5/1972 | U.S.S.R.. |

OTHER PUBLICATIONS

Kirk-Othmer, *Encyclopedia of Chemical Technology*, Third Edition, vol. 4 (1978) pp. 183, 184.

"Treatment of Electroless Nickel Plating Liquid", Kizai Kyogo Kyokai, *Nippon Hyomenshori* (i.e., Plating) pp. 30–48, 1981.

"Treatment of Hypophosphite Ion in Electroless Nickel Plating Aged Liquid Using Optical Catalyst", *Mekki no Sekai* (i.e., Plating World in Japanese), 294, pp. 68–72, Apr. 1992.

"Effect of Organic Acid on Treatment of Hypophosphite Ion in Electroless Nickel Plating Aged Liquid Using Optical Catalyst", *Mekki no Sekai* (i.e., Plating World in Japanese), 305, pp. 60–64, Jun. 1993.

"Removal of Phosphorus in Electroless Nickel Plating Waste Liquid by Calcium Hypochlorite", *Mekki no Sekai* (i.e. Plating World in Japanese) 289, pp. 40–44, 1992.

*Primary Examiner*—Wayne Langel
*Attorney, Agent, or Firm*—Burns, Doane, Swecker & Mathis

[57] ABSTRACT

A method for oxidizing a hypophosphite ion, comprised of bringing a solution containing a hypophosphite ion into contact with at least one catalyst selected from the group consisting of boron-nickel compounds, boron-cobalt compounds, and metallic palladium to oxidize the hypophosphite ion to a phosphite ion.

16 Claims, No Drawings

– 5,362,465 –

METHOD FOR OXIDIZING HYPOPHOSPHITE ION

BACKGROUND OF THE INVENTION

1. Field of the Invention

The present invention relates to a method for oxidizing a hypophosphite ion, more particularly to a method for oxidizing a hypophosphite ion to a phosphite ion.

2. Description of the Related Art

As is well known in the art, a hypophosphite ion is used in a wide range of fields such as electroless nickel plating, catalysts, reducing agents, metal surface treatment, and pharmaceuticals.

In recent years, there has been a demand for elimination of phosphorous compounds as they are factors behind the eutrophication of lakes, swamps, and other parts of the environment. Along with this, some regions have imposed restrictions on the discharge of phosphorus.

As one of the methods of treatment of such phosphorus compounds, an effective method of treatment of a hypophosphite ion contained in the waste liquor of electroless nickel plating and the waste liquor of manufacturing processes of hypophosphoric acid, but as of now no effective methods of eliminating the hypophosphite ion has been found. Therefore, at present, studies are being made of methods of oxidzation for oxidizing the hypophosphite ion to a phosphite ion or a phosphate ion and then eliminating these as metal salts.

For the oxidation of a hypophosphite ion, for example, there have been reports of, for example, (1) a method of oxidizing a hypophosphite ion by NaOCl at an acidic region, (2) a method of oxidizing a hypophosphite ion by electrolytic oxidation, (3) a method of oxidizing and eliminating a hypophosphite ion using copper salts, and (4) a method of oxidizing a hypophosphite ion by ultraviolet ray using an optical catalyst (for example, an anatase type titanium dioxide powder).

However, there were problems in the above-mentioned conventional methods of oxidation of a hypophosphite ion, such as the hazardousness of the processes and the high running costs and thus they were not satisfactory as a practical method.

SUMMARY OF THE INVENTION

Accordingly, objects of the present invention are to eliminate the above-mentioned problems in the conventional methods of oxidation of a hypophosphite ion and to provide a method of effectively oxidizing a hypophosphite ion and converting it to phosphite ion without hazard and at a low running cost.

In accordance with the present invention, there is provided a method of oxidizing a hypophosphite ion comprising bringing the hypophosphite ion into contact with at least one catalyst selected from the group consisting of boron-nickel compounds, boron-cobalt compounds, and metallic palladium to oxidize the hypophosphite ion to a phosphite ion.

DESCRIPTION OF THE PREFERRED EMBODIMENTS

As the boron-nickel compounds used in a first aspect of the present invention, various compounds may be included, but mention may be made of nickel boride (NiB or $Ni_2B$). The amount of the nickel boride is not particularly limited. The desired oxidation reaction starts with the addition of NiB or $Ni_2B$, but the preferable amount is at least 0.01 g/liter so as to give a sufficient reaction rate. A particularly preferable range is 0.1 to 1 g/liter. In general, when the amount added is too small, the desired oxidation rate cannot be obtained, while when too large, there is a tendency for a larger loss of the catalyst.

The boron-nickel compound used in the present invention can be formed by, for example, reacting a solution containing nickel by a reducing agent (e.g., $NaBH_4$, dimethylamineborane, $KBH_4$, etc.) containing boron (i.e., boron-containing reducing agent) so as to produce a boron-nickel compound in the solution and oxidize the hypophosphite ion in the solution to a phosphite ion in that state. Thus, the amount of the boron-nickel compound in the solution, as mentioned above, is preferably 0.01 g/liter or more.

The above-mentioned boron-nickel compound can be used directly or carried on a suitable carrier (e.g., activated carbon, alumina, diatomite, etc.)

According to the present invention, when for example a solution containing a hypophosphite ion to be treated contains nickel ions or nickel complex ions, the addition of a boron-containing reducing agent can oxidize the hypophosphite ion in the solution to a phosphite ion. Note that the above-mentioned nickel-boron compounds can be used repeatedly for the oxidation reaction by separation after oxidation of the hypophosphite ion to the phosphite ion. In particular, when treating a waste solution of electroless nickel plating, by adding a borohydride compound (for example, sodium borohydride or potassium borohydride) to the electroless nickel plating waste solution, it is possible to oxidize the hypophosphite ion to the phosphite ion.

The pH conditions and temperature conditions of the oxidation reaction of the hypophosphite ion by the boron-nickel compound in accordance with the present invention are not particularly limited, but preferably the pH is 5 to 10 and the reaction temperature is an ordinary temperature or higher. The preferable temperature is from room temperature to 80° C.

As the boron-cobalt compounds used in the second aspect of the present invention, various compounds may be included, but mention may be made of cobalt borides (CoB or $Co_2B$). The amount of the cobalt borides is not particularly limited. The desired oxidation reaction starts with the addition of CoB or $Co_2B$, but preferably when there is at least 0.01 g/liter, a sufficient reaction rate will be shown. A particularly preferable range is 0.1 to 1 g/liter. In general, when the amount added is too small, the desired oxidation rate cannot be obtained, while when the amount is too large, there is a tendency for a larger loss of the catalyst.

The boron-cobalt compound used in the present invention can be formed by reacting a solution containing cobalt with a boron-containing reducing agent (e.g., $NaBH_4$, dimethylamineborane, $KBH_4$, etc.) so as to produce a boron-cobalt compound in the solution and oxidize the hypophosphite ion in the solution to a phosphite ion in that state. The amount of the boron-cobalt compound in the solution, as mentioned above, is preferably 0.01 g/liter or more.

The above-mentioned boron-cobalt compound can be used directly or supported on a suitable carrier (for example, activated carbon, alumina, diatomire, etc.)

According to the present invention, when for example a solution containing a hypophosphite ion to be treated contains cobalt ions or cobalt complex ions, the addition of a boron-containing reducing agent can cause oxidation of the hypophosphite ion in the solution to a phosphite ion. Note that the above-mentioned cobalt-boron compounds can be used repeatedly for the oxidation reaction by separation after oxidation of the hypophosphite ion to the phosphite ion.

The pH conditions and temperature conditions of the oxidation reaction of the hypophosphite ion by the boron-cobalt compound in accordance with the present invention are not particularly limited, but preferably the pH is 5 to 10 and the reaction temperature is an ordinary temperature or higher. The preferable temperature is from a room temperature to 80° C.

In the third aspect of the present invention, use is made of metallic palladium as the catalyst. The amount added is not particularly limited. The desired oxidation reaction starts with the addition of the palladium, but preferably when there is at least 0.005 g/liter, a sufficient reaction rate will be shown. A particularly preferable range is 0.01 to 1 g/liter. In general, when the amount added is too small, the desired oxidation rate cannot be obtained, while when the amount is too large, there is a tendency for a larger loss of the catalyst.

The palladium used in the present invention can be Formed by reacting a solution containing palladium or that solution in a state impregnated in a suitable carrier with a boron-containing reducing agent (for example, $NaBH_4$, dimethylamineborane, $KBH_4$, etc.) so as to produce metallic palladium in the solution and oxidize the hypophosphite ion in the solution to the phosphite ion in that state. The amount of the metallic palladium in the solution, as mentioned above, is preferably 0.005 g/liter or more.

The above-mentioned metallic palladium can be used directly or supported on a suitable carrier (e.g., activated carbon, alumina, diatomite, etc.). In particular, when supported on a carrier, there is superior separation from the reaction solution, which is advantageous for repeated use. Further, when the palladium supported on a carrier is filled in a column and an aqueous solution containing a hypophosphite ion is passed therethrough, the oxidation reaction rate becomes much faster.

According to the present invention, when the solution containing the hypophosphite ion to be treated contains nickel ions or nickel complex ions, if that solution is brought into contact with metallic palladium or palladium produced by precipitation by a reducing agent from a catalyst or carrier supporting metallic palladium or a solution containing palladium, nickel and nickel compounds are precipitated by a secondary reaction. This also promotes the reaction for oxidizing the hypophosphite ion to the phosphite ion. The referable pH is weakly acidic to alkaline (preferably pH 4 to 10).

Further, when the hypophosphite ion compound is caused to act on a solution containing nickel ions and nickel complex compounds, the reduction reaction produces nickel and nickel compounds, and these products also promote the oxidation reaction of the hypophosphite ion. The preferable pH is 1 or more, more preferably 3.5 to 10.

The above-mentioned palladium, nickel, and nickel compounds may be repeatedly used for the oxidation reaction by separation after oxidizing the hypophosphite ion to the phosphite ion.

The pH conditions and temperature conditions of the oxidation reaction of the hypophosphite ions in accordance with the present invention are not particularly limited, but preferably the pH is weakly acidic to alkaline (for example, pH 3.5 to 10) and the reaction temperature is the freezing temperature or higher. The preferable temperature is an ordinary temperature or more, particularly a room temperature to 80° C.

EXAMPLES

The present invention will now be further illustrated by, but is by no means limited to the following Examples.

EXAMPLE 1-1

Sodium borohydride ($NaBH_4$) (5 g/liter) was added to an electroless nickel plating waste solution containing nickel (45,000 mg/liter) and a hypophosphite ion (12,400 mg/liter) to start the oxidation reaction of the hypophosphite ion. Samples were taken at a predetermined interval and the concentrations of a hypophosphite ion and a phosphite ion in the filtrates were measured.

The results are shown in Table 1-1.

TABLE 1-1

| Sample | Reaction time (min) | Hypophosphite ion (mg/l) | Phosphite ion (mg/l) | Ni (mg/l) | pH |
|---|---|---|---|---|---|
| Starting solution | — | 12,400 | 46,300 | 45,000 | 9.2 |
| Reacted solution | 2 | 11,200 | 46,800 | — | — |
|  | 5 | 10,200 | 46,100 | — | — |
|  | 10 | 10,100 | 49,500 | — | — |
|  | 30 | 3,040 | 55,400 | — | — |
|  | 60 | 0 | 56,600 | — | — |

Example 1-2

A 27 ml amount of a 10% by weight aqueous solution of sodium borohydride ($NaBH_4$) was added to 121 ml of a 5% by weight aqueous solution of nickel chloride ($NiCl_2.6H_2O$) with agitation, whereupon a black precipitate was produced. The precipitate was fully washed so as not to be exposed to the air and thus a boron-nickel catalyst was prepared.

On the other hand, as a test solution containing a hypophosphite ion, a 0.5% by weight aqueous solution of sodium hypophosphite ($NaHPO_2.H_2O$) was prepared (hypophosphite ion: 2960 mg/liter). This test solution was adjusted to pH 5 to 11 with NaOH or HCl and then the boron-nickel catalyst prepared above was added. The solution was caused to react at an ordinary temperature for 30 minutes, allowed to stand, then filtered, and then the concentrations of the hypophosphite ion and the phosphite ion in the supernatent were measured.

The results are shown in Table 1-2.

TABLE 1-2

| pH | Hypophospite ion (mg/l) | Phosphite ion (mg/l) | Am't of catalyst added (mg Ni/l) |
|---|---|---|---|
| 5 | 320 | 3,200 | 20 |
| 6 | 150 | 3,400 | 20 |
| 7 | 0 | 3,600 | 20 |
| 8 | 0 | 3,600 | 20 |
| 9 | 0 | 3,600 | 20 |
| 10 | 0 | 3,600 | 20 |
| 11 | 88 | 3,100 | 20 |
| Starting solution | 2,960 | 0 | — |

Example 1-3

A 1 g/liter amount of sodium borohydride ($NaBH_4$) was added to an electroless nickel plating waste solution containing nickel (45,000 mg/liter) and a hypophosphite ion ($PO_2$: 12,400 mg/liter). This was reacted at an ordinary temperature for about one hour, then the precipitate product was filtered and the concentrations of a hypophosphite ion and a phosphite ion in the filtrate were measured (Test 1).

Next, the supernatent was discarded, then the above-mentioned electroless nickel plating waste solution was added. This was agitated again at an ordinary temperature for one hour to produce a precipitate which was then filtered. The concentrations of the hypophosphite and phosphite ions in the filtrate were measured (Test 2).

The results are shown in Table 1-3.

TABLE 1-3

|  | Hypophosphite ion (mg/l) | Phosphite ion (mg/l) | Ni (mg/l) | pH |
|---|---|---|---|---|
| Starting solution | 12,400 | 46,300 | 45,000 | 9.2 |
| Test 1 | 141 | 62,300 | — | — |
| Test 2 | 177 | 62,100 | — | — |

Example 2-1

Sodium borohydride ($NaBH_4$) (3 g/liter) was added to an aqueous solution containing cobalt (6,000 mg/liter) and a hypophosphite ion (11,000 mg/liter) to start the oxidation reaction of the hypophosphite ion. Samples were taken at predetermined intervals and the concentrations of hypophosphite ion and phosphite ion in the filtrates after filtration were measured.

The results are shown in Table 2-1.

TABLE 2-1

| Sample | Reaction time (hr) | Hypophosphite ion (mg/l) | Phosphite ion (mg/l) | Co (mg/l) | pH |
|---|---|---|---|---|---|
| Starting solution | — | 11,000 | 0 | 6,000 | 7.5 |
| Reacted solution | 0.5 | 7,100 | 4,900 | — | — |
|  | 1 | 3,400 | 9,500 | — | — |
|  | 2 | 2,000 | 11,000 | — | — |
|  | 3 | 700 | 13,000 | — | — |
|  | 4 | 50 | 14,000 | — | — |

Example 2-2

A 27 ml amount of a 10% by weight aqueous solution of sodium borohydride ($NaBH_4$) was added to 120 ml of a 5% by weight aqueous solution of cobalt chloride ($COCl_2.6H_2O$) with agitation, whereupon a black precipitate was produced. The precipitate was fully washed so as not to be exposed to the air and a boron-cobalt catalyst was prepared.

On the other hand, as a test solution containing a hypophosphite ion, an aqueous solution containing 120 mg/liter of a hypophosphite ion and 600 mg/liter of phosphite ions was prepared. This test solution was adjusted to pH 6 to 11 with NaOH or HCl and then the boron-cobalt catalyst prepared above was added. The solution was caused to react at an ordinary temperature for 3 to 3.5 hours, allowed to stand, then filtered, and then the concentrations of the hypophosphite and phosphite ions in the supernatent were measured.

The results are shown in Table 2-2.

TABLE 2-2

| pH | Hypophosphite ion (mg/l) | Phosphite ion (mg/l) | Am't of catalyst added (mg Ni/l) | Reaction time (hr) |
|---|---|---|---|---|
| 6 | 10 | 750 | 20 | 3 |
| 7 | 10 | 740 | 20 | 3 |
| 8 | 20 | 720 | 20 | 3 |
| 9 | 60 | 680 | 20 | 3 |
| 10 | 80 | 660 | 20 | 3 |
| 11 | 100 | 630 | 20 | 3 |
| Starting solution | 120 | 600 | — | — |

Example 2-3

A 1 g/liter amount of sodium borohydride ($NaBH_4$) was added to an aqueous solution containing cobalt (2100 mg/liter), a hypophosphite ion ($PO_2$: 24,00 mg/liter), and a phosphite ion ($PO_3$: 63,00 mg/liter). This was reacted at an ordinary temperature for about 3 hours, then was allowed to stand and then filtered, then the concentrations of hypophosphite and phosphite ions in the filtrate were measured (Test 1).

Next, the supernatent was discarded, then the above-mentioned aqueous solution was added. This was agitated again at an ordinary temperature for 3 hours to produce a precipitate which was then filtered. The concentrations of the hypophosphite and phosphite ions in the filtrate were measured (Test 2).

The results are shown in Table 2-3.

TABLE 2-3

|  | Hypophosphite ion (mg/l) | Phosphite ion (mg/l) | Co (mg/l) | pH |
|---|---|---|---|---|
| Starting solution | 12,400 | 46,300 | 2,100 | 7.5 |
| Test 1 | 150 | 62,000 | — | — |
| Test 2 | 170 | 61,800 | — | — |

Example 3-1

One liter of an aqueous solution containing sodium hypophosphite ($NaH_2PO_2.2H_2O$) (hypophosphite ion: 1000 mg/liter) (pH 7.1) was raised in temperature on a hot water bath and heated to reach the reaction temperature shown in Table 3-1, then 1g of palladium-activated carbon (Pd content of 0.5%) was added and the mixture was agitated to start the oxidation reaction of the hypophosphite ion. Samples were taken at predetermined intervals and the concentrations of hypophosphite and phosphite ions in the filtrates after filtration were measured.

The results are shown in Table 3-1.

TABLE 3-1

| Reaction temp. (°C.) | Am't of catalyst added (g/l) | Phosphorus mode (mg/l) | 30 min. | 60 min. | 90 min. | 120 min. |
|---|---|---|---|---|---|---|
| 23° C. | 1 g/l | Hypophosphite ion | 532 | 248 | 353 | 87 |
|  |  | Phosphite ion | 518 | 882 | 748 | 1120 |
| 50° C. | 1 g/l | Hypophosphite ion | 624 | 294 | 291 | 175 |
|  |  | Phosphite ion | 580 | 1020 | 1060 | 1200 |
| 71° C. | 1 g/l | Hypophosphite ion | 254 | 7 | 0 | — |
|  |  | Phosphite ion | 960 | 1270 | 1210 |  |
| 24° C. | 5 g/l | Hypophosphite ion | 385 | 45 | 41 | 0 |

TABLE 3-1-continued

| Reaction temp. (°C.) | Am't of catalyst added (g/l) | Phosphorus mode | 30 min. | 60 min. | 90 min. | 120 min. |
|---|---|---|---|---|---|---|
| 27° C. | 10 g/l | Phosphite ion | 703 | 1010 | 1180 | 1230 |
|  |  | Hypophosphite ion | 222 | 0 | — | — |
|  |  | Phosphite ion | 958 | 1210 | — | — |

Note: Starting solution: 1020 mg/l hypophosphite ion and 0 mg/l phosphite ion.

Example 3-2

A 0.5% by weight aqueous solution of sodium hypophosphite ($NaH_2PO_2.H_2O$) was prepared and added with HCl or NaOH to prepare a solution with the pH shown in Table 3-2. To this solution was added 1 g/liter of palladium-activated carbon (Pd 0.5%). The oxidation reaction of the hypophosphite ion was caused at an ordinary temperature for 3 hours and then the concentrations of the hypophosphite and phosphite ions were measured.

The results are shown in Table 3-2.

TABLE 3-2

| pH | Reactivity* | Hypophosphite ion (mg/l) | Phosphite ion (mg/l) |
|---|---|---|---|
| 3.8 | ++ | 400 | 3180 |
| 5.0 | ++ | 250 | 3300 |
| 6.2 | ++ | 150 | 3540 |
| 8.1 | ++ | 165 | 3510 |
| 11 | + | 152 | 3530 |

Note: Starting solution: 2970 mg/l hypophosphite ion and 0 mg/l phosphite ion.
*Reactivity: ++: Extremely good (extremely good production of hydrogen gas)
+: Good (small production of hydrogen gas)

Example 3-3

A test was conducted on a simulated electroless nickel plating waste solution (Ni: 7700 mg/liter, hypophosphite ion: 9890 mg/liter, phosphite ion: 44,900 mg/liter). One g of palladium-activated carbon (palladium content 0.5%) was added to 100 ml of the sample, then the solution was replaced entirely once a day with respect to the palladium-activated carbon and the precipitate. The concentrations of Ni, a hypophosphite ion, and a phosphite ion in the reacted solution were measured. The procedure was continued for days.

The results are shown in Table 3-3.

TABLE 3-3

| No. of days elapsed (days) | Ni (mg/l) | Hypophosphite ion (mg/l) | Phosphite ion (mg/l) |
|---|---|---|---|
| 1 | 6700 | 483 | 59,900 |
| 2 | 6200 | 0 | 64,100 |
| 3 | 6100 | 0 | 64,500 |
| 4 | 6000 | 0 | 61,900 |
| 5 | 5540 | 0 | 63,000 |
| 6 | 5460 | 0 | 63,000 |
| 7 | 5400 | 0 | 63,700 |
| Starting solution | 7700 | 9890 | 44,900 |

Example 3-4

A solution of 50 g/liter of sodium hypophosphite ($NaH_2PO_2.H_2O$) was prepared. To this was added $NiSO_4.6H_2O$ at a rate of 53.3 g/liter. The nickel and nickel compounds were precipitated at a solution temperature of 80° C. and a pH 9. The supernatent of the solution was discarded, the muddy portion was taken, and a slurry was obtained (Ni content 7940 mg/liter).

On the other hand, an aqueous solution of 10 g/liter of $NaH_2PO_2.H_2O$ was prepared. To this was added 8g of $NiSO_4.6H_2O$, then the solution was raised in temperature to 75° C. Next, the pH was adjusted to 5 to 10 by NaOH, 2 ml of the slurry was added, and a reaction was caused.

The results are shown in Tables 3-4 and 3-5.

TABLE 3-4

| Slurry | pH | Starting solution | 5 min. | 10 min. | 14 min. | Temp. (°C.) |
|---|---|---|---|---|---|---|
| 2 ml | 10 | $PO_2$ mg/l 5930 | 4880 | 588 | 500 | 70 |
|  |  | $PO_3$ mg/l 0 | 0 | 5090 | 4950 |  |

TABLE 3-5

| Slurry | pH | Hypophosphite ion (mg/l) | Phosphite ion (mg/l) | Temp. (°C.) | Reaction time (min) |
|---|---|---|---|---|---|
| 2 ml | 5 | 2020 | 4900 | 75 | 20 |
|  | 6 | 0 | 5910 |  |  |
|  | 7 | 0 | 5950 |  |  |
|  | 8 | 0 | 5420 |  |  |
|  | 9 | 0 | 5720 |  |  |
| Starting solution |  | 5930 | 0 | — | — |

As explained above, according to the present invention, by using boron-nickel compounds, boron-cobalt compounds, and metallic palladium, it is possible to oxidize a hypophosphite ion in waste solutions at a room temperature without hazard in the process inexpensively and effectively and convert to a phosphite ion.

I claim:

1. A method for oxidizing a hypophosphite ion, comprising bringing an aqueous containing a hypophosphite ion into contact with at least one catalyst selected from the group consisting of boron-nickel compounds, boron-cobalt compounds, and metallic palladium to oxidize the hypophosphite ion to a phosphite ion.

2. A method as claimed in claim 1, wherein the catalyst is a boron-nickel compound.

3. A method as claimed in claim 2, wherein the boron-nickel compound is supported on a carrier.

4. A method as claimed in claim 2, wherein the boron-nickel compound is a boron-nickel compound obtained by precipitation by adding a boron-containing reducing agent to a solution containing nickel ions or nickel complex ions or a carrier impregnated with that solution.

5. A method as claimed in claim 2, wherein the hypophosphite ions are oxidized to a phosphite ion by adding a boron-containing reducing agent to a solution containing a hypophosphite ion and nickel ions or nickel complex ions.

6. A method as claimed in claim 2, wherein the boron-nickel compound obtained by precipitation from a solution containing a boron-containing reducing agent, and nickel ions or nickel complex ions is brought into contact with a solution containing a hypophosphite ion to oxidize the hypophosphite ion to a phosphite ion.

7. A method as claimed in claim 1, wherein the catalyst is a boron-cobalt compound.

8. A method as claimed in claim 7, wherein the boron-cobalt compound is supported on a carrier.

9. A method as claimed in claim 7, wherein the boron-cobalt compound is a boron-cobalt compound obtained from precipitation by adding a boron-containing reducing agent to a solution containing cobalt ions or cobalt complex ions or a carrier impregnated with that solution.

10. A method as claimed in claim 7, wherein the hypophosphite ion is oxidized to a phosphite ion by adding a boron-containing reducing agent to an aqueous solution containing a hypophosphite ion and cobalt ions or cobalt complex ions.

11. A method as claimed in claim 7, wherein the boron-cobalt compound obtained by precipitation from a solution containing a boron-containing reducing agent and cobalt ions or cobalt complex ions, is brought into contact with an aqueous solution containing a hypophosphite ion to oxidize the hypophosphite ion to a phosphite ion.

12. A method as claimed in claim 1, wherein the catalyst is metallic palladium.

13. A method as claimed in claim 12, wherein the metallic palladium is supported on a carrier.

14. A method as claimed in claim 12, wherein the metallic palladium is metallic palladium obtained from precipitation by adding a boron-containing reducing agent to a solution containing palladium.

15. A method for oxidizing a hypophosphite ion comprising reacting an aqueous electroless nickel plating waste solution including a hypophosphite ion and a nickel or nickel complex ion with a borohydride compound to oxidize the hypophosphite ion to a phosphite ion.

16. A method as claimed in claim 15, wherein a reaction product of the nickel or nickel complex ion with the borohydride compound is repeatedly used and promotes the oxidation of the hypophosphite ion in the aqueous electroless nickel plating waste solution.

* * * * *